US012599184B2

(12) United States Patent
Anderson et al.

(10) Patent No.: US 12,599,184 B2
(45) Date of Patent: Apr. 14, 2026

(54) PERSONAL PROTECTIVE EQUIPMENT ENSEMBLE MADE UP OF A LAUNDERABLE HOOD AND AN AIR DISPERSION PROTECTIVE FACE SHIELD ASSEMBLY

(71) Applicant: UniTech Services Group, Inc., Longmeadow, MA (US)

(72) Inventors: Kent David Anderson, Clayton, NY (US); Rolf Eberl, Kincardine (CA); Peter Eberl, Kincardine (CA); Daniel Naygeboren, Dollard-des-Ormeaux (CA)

(73) Assignee: UniTech Services Group, Inc., Longmeadow, MA (US)

( * ) Notice: Subject to any disclaimer, the term of this patent is extended or adjusted under 35 U.S.C. 154(b) by 4 days.

(21) Appl. No.: 18/819,391

(22) Filed: Aug. 29, 2024

(65) Prior Publication Data

US 2025/0000182 A1 Jan. 2, 2025

Related U.S. Application Data

(63) Continuation-in-part of application No. 17/142,708, filed on Jan. 6, 2021, now abandoned.

(51) Int. Cl.
*A41D 13/002* (2006.01)
*A41D 13/11* (2006.01)
(Continued)

(52) U.S. Cl.
CPC ........ *A41D 13/002* (2013.01); *A41D 13/1184* (2013.01); *A62B 9/003* (2013.01);
(Continued)

(58) Field of Classification Search
CPC .. A62B 18/04; A62B 7/12; A62B 9/00; A62B 9/02; A62B 17/006; A62B 17/04;
(Continued)

(56) References Cited

U.S. PATENT DOCUMENTS 645,408 A * 3/1900 Vajen ..................... A62B 18/04 128/201.16
1,071,223 A * 8/1913 Garrity .................. A62B 17/04 128/201.23
(Continued)

FOREIGN PATENT DOCUMENTS

CA 2852110 A1 * 12/2014
DE 102015108562 A1 * 12/2016 ........... A62B 18/084
(Continued)

OTHER PUBLICATIONS

English translation for DE 102015108562, machined translated by espacenet.com.*
(Continued)

*Primary Examiner* — Tu A Vo
(74) *Attorney, Agent, or Firm* — Bulkley, Richardson and Gelinas, LLP; Mary R. Bonzagni, Esq.

(57) ABSTRACT

A Personal Protective Equipment (PPE) ensemble made up of a launderable protective hood and either an air dispersion protective headgear, or an air dispersion protective face shield assembly, is provided. In a first exemplary embodiment, the PPE ensemble is made up of a launderable hood that is detachably affixed to and forms a gas-restrictive seal with a protective face shield assembly, an air-supplied protective suit having an air supply inlet/outlet assembly, and an air dispersion protective headgear releasably coupled to the air supply inlet/outlet assembly of the protective suit. In a second exemplary embodiment, instead of an air dispersion protective headgear, the PPE ensemble is made up of an air dispersion protective face shield assembly and a standard protective headgear. The PPE ensemble, among other things, maintains or cools the skin temperature of a wearer's face during use and thus reduces wearer fatigue.

15 Claims, 10 Drawing Sheets

(51) Int. Cl.

| | |
|---|---|
| ***A62B 7/02*** | (2006.01) |
| ***A62B 9/00*** | (2006.01) |
| ***A62B 9/04*** | (2006.01) |
| ***A62B 17/00*** | (2006.01) |
| ***A62B 17/04*** | (2006.01) |
| ***A62B 18/08*** | (2006.01) |

(52) U.S. Cl.
CPC .............. *A62B 9/04* (2013.01); *A62B 17/006* (2013.01); *A62B 17/04* (2013.01); *A62B 18/082* (2013.01); *A62B 7/02* (2013.01)

(58) Field of Classification Search
CPC ....... A62B 18/006; A62B 18/084; A62B 7/10; A62B 18/045; A62B 18/08; A62B 18/082; A41D 13/1184; A41D 13/1153; B23P 19/10; A61F 9/068
See application file for complete search history.

(56) References Cited

U.S. PATENT DOCUMENTS 1,885,745 A * 11/1932 Malcom ................ A62B 18/04 2/182.6
2,354,502 A * 7/1944 Cockrill ................. A61F 9/061 49/67
2,447,433 A * 8/1948 Schroeder .............. A62B 18/04 128/201.15
2,469,273 A * 5/1949 Parker ..................... A61F 9/068 128/205.25
2,573,414 A * 10/1951 Dunn ................. A41D 13/0025 2/81
2,577,607 A * 12/1951 Conley ................ A62B 18/003 128/201.25
2,773,262 A * 12/1956 Brouha .............. A41D 13/0025 2/81
3,098,233 A * 7/1963 Hoagland .............. A62B 17/04 2/205
3,103,104 A * 9/1963 Shackson ........... A41D 13/0053 62/5
3,112,745 A * 12/1963 Boyer ..................... A61F 9/068 128/201.23
3,413,972 A * 12/1968 Depping .............. A62B 18/045 128/201.23
3,777,750 A * 12/1973 Savornin .............. A62B 17/006 2/457
4,019,508 A * 4/1977 Der Estephanian ......................... A61M 16/1065 128/202.19
4,055,173 A * 10/1977 Knab ................. A41D 13/1153 128/201.29
4,127,130 A * 11/1978 Naysmith .............. A62B 17/04 96/380
4,172,294 A * 10/1979 Harris .................... A62B 18/04 2/416
4,183,101 A * 1/1980 Melander ................. A42B 3/22 2/205
4,271,833 A * 6/1981 Moretti ................ A62B 17/006 128/201.28
4,455,687 A * 6/1984 Johansson .............. A62B 18/08 2/205
4,513,452 A * 4/1985 Rankin, Sr. ........ A41D 13/0053 2/84
4,901,716 A * 2/1990 Stackhouse .............. A42C 5/04 128/201.28
5,293,864 A * 3/1994 McFadden .............. B63C 11/18 128/205.24
6,012,175 A * 1/2000 Johnston ................ A62B 17/04 2/202
6,076,571 A * 6/2000 Burns .................. A62B 17/006 141/383
9,554,604 B2 * 1/2017 Rippert .................. A41D 27/28
2003/0192103 A1 * 10/2003 Avery .................. A62B 17/006 2/69
2004/0226558 A1 * 11/2004 Kausch ................ A62B 17/005 128/201.29
2006/0107448 A1 * 5/2006 Brookman ........... A62B 17/006 2/457
2007/0050898 A1 * 3/2007 Larson ................. A62B 18/045 2/456
2009/0100560 A1 * 4/2009 Anderson .............. A42B 1/048 2/457
2010/0294270 A1 * 11/2010 Curran ................. A62B 18/045 128/201.23
2013/0062468 A1 3/2013 Yokoi
2017/0296848 A1 * 10/2017 Lawson ............... A62B 17/006
2020/0275724 A1 * 9/2020 Jefferis .................. A42B 3/286
2020/0375272 A1 12/2020 Ulmer et al.
2022/0212040 A1 * 7/2022 Anderson .............. A62B 17/04
2023/0293918 A1 * 9/2023 Scholes ................ A62B 18/045 128/201.23
2023/0302307 A1 * 9/2023 Scholes .................. A62B 18/04

FOREIGN PATENT DOCUMENTS

EP 2392385 A1 12/2011
GB 2599663 A * 4/2022 ............. A62B 17/04
KR 20210107314 A * 9/2021 ............. A62B 23/02
WO WO-2008106135 A1 * 9/2008 ............. A42B 3/286

OTHER PUBLICATIONS

English translation for KR 20210107314, machined translated by espacenet.com.*

* cited by examiner

PERSONAL PROTECTIVE EQUIPMENT ENSEMBLE MADE UP OF A LAUNDERABLE HOOD AND AN AIR DISPERSION PROTECTIVE FACE SHIELD ASSEMBLY

CROSS-REFERENCE TO RELATED APPLICATION

This application is a continuation-in-part application of U.S. patent application Ser. No. 17/142,708, filed Jan. 6, 2021, the content of which is incorporated herein by reference.

TECHNICAL FIELD

The present invention generally relates to a Personal Protective Equipment (PPE) ensemble made up of a launderable hood and either an air dispersion protective headgear, or an air dispersion protective face shield assembly. More specifically, in a first exemplary embodiment, the PPE ensemble is made up of a launderable hood that is detachably affixed to and forms a gas-restrictive seal with a protective face shield assembly, an air-supplied protective suit having an air supply inlet/outlet assembly, and an air dispersion protective headgear (e.g., a hardhat) releasably coupled to the air supply inlet/outlet assembly of the protective suit. In a second exemplary embodiment, the PPE ensemble is made up of a launderable hood that is detachably affixed to and forms a gas-restrictive seal with an air dispersion protective face shield assembly, an air-supplied protective suit having an air supply inlet/outlet assembly, wherein the air dispersion protective face shield assembly is releasably coupled to the air supply inlet/outlet assembly of the protective suit, and a protective headgear.

BACKGROUND

Protective hoods are used to shield or isolate individuals from chemical, physical, and biological hazards that may be encountered during hazardous materials operations. A protective hood may be designed to cover only the head, face, and shoulders, or it may form part of a smock style top worn with pants, coveralls, or a full-body suit, where the smock style top covers the head, face, arms, and torso. A protective hood may also form part of a protective full-body suit, which typically covers the wearer from neck to toe and provides cooling air and an optional communications line.

Tritium hoods and protective suits protect a wearer against inhalation and skin exposure of Hydrogen-3, H-3, or $^{3}H$ (a.k.a. tritium) in nuclear plants. Tritium is a radioactive isotope of hydrogen that contains one proton and two neutrons. It is a gas at standard temperature and pressure. Tritium is produced in nature and is also industrially produced as a by-product in nuclear reactors by neutron activation of Lithium-6 as well as in heavy water-moderated reactors. Tritium is difficult to contain; rubber, plastic, and some kinds of steel are somewhat permeable to tritium. The emitted electrons from small amounts of tritium cause phosphors to glow; hence, tritium is used to make self-illuminating devices, such as watches and exit signs. Tritium is also used in nuclear weapons.

Some tritium hoods are made with a TYVEK® QC fabric containing a thin, ten millimeter LEXAN® shield or visor which is affixed permanently to the fabric, while other tritium hoods employ a visor assembly, which allows for a visor to be press fit into the visor assembly for easy removal and replacement. Examples of the latter visor assemblies are shown and described in U.S. Patent Application Publication No. US 2009/0100560 A1 and Canadian Patent No. 2852110. These visor assemblies utilize many fasteners around the perimeter of the assembly, which require relatively large holes in the visor and suit material to accommodate the fasteners, thus causing greater difficulty in sealing.

Headgear in the form of, for example, a hard hat may be worn under these protective hoods with an optional wireless or wired communication headset.

As indicated above, tritium hoods may be worn with a one-piece full-body Tritium suit, an example of which is the MARK IIIB™ protective suit. The MARK IIIB™ protective suit is composed of a polyvinyl chloride (PVC) coated polyester that is double sealed, which serves to ensure a consistent positive pressure within the suit thereby protecting the wearer from contamination. e Protective suits such as the MARK IIIB™ suit exhaust air through the neck of the suit which fills the protective hood. As soon as the upper part of the hood is filled, however, air will exit through the arm sleeves of the hood resulting in a loss in air flow. This causes heat stress in the worker which results in moisture build up under the hood from the worker's perspiration and the concomitant fogging of the visor. As will be readily appreciated by those skilled in the art, such factors reduce worker productivity by shortening the worker's "jump" time, thus limiting the scope of work that can be completed in an allotted amount of time.

The present invention serves to address these problems by providing a PPE ensemble that maintains or cools the skin temperature of the wearer of the ensemble and that includes a protective face shield assembly that demonstrates reduced or no lens fogging. Although tritium hoods and protective suits are described herein, the contemplated use(s) of the PPE ensemble of the present invention is not so limited. The inventive PPE ensemble can be utilized to shield or isolate individuals from chemical, physical, and biological hazards that may be encountered during any hazardous materials operation. Moreover, although launderable hoods are described herein, nonwashable hoods are also contemplated for use in the subject invention.

SUMMARY

In particular, the present invention provides a PPE ensemble which serves to shield or isolate workers entering radiation control areas from chemical, physical, and biological hazards. The terms "wearer" and "worker" and the terms "visor" and "lens" are used interchangeably in the subject specification.

In a first exemplary embodiment, the inventive PPE ensemble comprises: an optionally launderable protective hood that is detachably affixed to and forms a gas-restrictive seal with a low fogging protective face shield assembly; and a protective headgear worn under the hood that defines an air flow pathway. In a preferred embodiment, the PPE ensemble comprises: the optionally launderable protective hood; an air-supplied protective suit having an air supply inlet/outlet assembly; and the protective headgear releasably coupled to the air supply inlet/outlet assembly of the protective suit.

In a second exemplary embodiment, the inventive PPE ensemble comprises: an optionally launderable protective hood that is detachably affixed to and forms a gas-restrictive seal with an air dispersion protective face shield assembly; and a protective headgear worn under the hood. In a preferred embodiment, the PPE ensemble comprises: the optionally launderable protective hood; an air-supplied protective suit having an air supply inlet/outlet assembly; the air dispersion protective face shield assembly, which is releasably coupled to the air supply inlet/outlet assembly of the protective suit; and the protective headgear.

The present invention also provides a method for laundering the protective hood of the PPE ensemble, the method comprising: disassembling and removing the protective face shield assembly, which has a shield or lens, from the protective hood; laundering the protective hood; either separately cleaning or replacing the shield or lens; and then reassembling the protective face shield assembly onto the protective hood.

The present invention further relates to a method for reducing or eliminating fogging of a shield or lens in the protective face shield assembly of the PPE ensemble of the present invention, the method comprising:

diverting a portion of air from the air supply inlet/outlet assembly of the protective suit to either the protective headgear (thus causing air flow within the protective headgear in contrast with prior art motionless air/no air flow hoods currently in use), or to the air dispersion protective face shield assembly; and directing the diverted air either over the top of a worker's head and down over the worker's face, or toward the worker and the shield or lens of the air dispersion protective face shield assembly, thereby cooling the worker's face and reducing worker perspiration and concomitant fogging of the shield or lens.

The present invention also relates to a method for reducing worker fatigue when wearing headgear under the protective hood of the PPE ensemble of the present invention, the method comprising:

diverting a portion of air from the air supply inlet/outlet assembly of the protective suit to either the protective headgear, or to the air dispersion protective face shield assembly; and directing the diverted air either over the top of the worker's head and down over the worker's face, or toward the worker and the shield or lens of the air dispersion protective face shield assembly, thereby cooling the worker's face and reducing worker fatigue.

Other features and advantages of the invention will be apparent to one of ordinary skill from the following detailed description and accompanying drawings.

Unless otherwise defined, all technical and scientific terms used herein have the same meaning as commonly understood by one of ordinary skill in the relevant art(s). All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Components in the drawings are not necessarily to scale, emphasis instead being placed upon clearly illustrating the principles of the present disclosure.

Particular features of the disclosed invention are illustrated by reference to the accompanying drawings of the following exemplary embodiments of the present invention:

FIGS. 3A and 3B are plan views of the inner arcuate frame member of the first exemplary embodiment of the protective face shield assembly, wherein FIG. 3A is a plan view of the outer surface of the inner arcuate frame member, and FIG. 3B is a plan view of the inner surface of the inner arcuate frame member;

FIGS. 4A and 4B are plan views of the outer arcuate frame member of the protective face shield assembly, wherein FIG. 4A is a plan view of the outer surface of the outer arcuate frame member, and FIG. 4B is a plan view of the inner surface of the outer arcuate frame member;

FIG. 6A is an exploded side perspective view of the air supply inlet/outlet assembly of the present invention, while

FIG. 7A is a side perspective view of the protective headgear in the form of a hard hat of the first exemplary embodiment of the inventive PPE ensemble, while

FIG. 9 is a perspective view of an embodiment of the air dispersion protective face shield assembly of the second exemplary embodiment of the present invention, while

DETAILED DESCRIPTION

As indicated above, in a first exemplary embodiment, the PPE ensemble of the present invention comprises: a launderable protective hood that is detachably affixed to and forms a gas-restrictive seal with a protective face shield assembly; and a protective headgear worn under the hood that defines an air flow pathway. In a preferred embodiment, the PPE ensemble further comprises an air-supplied protective suit having an air supply inlet/outlet assembly, wherein the protective headgear is releasably coupled to the air supply inlet/outlet assembly of the protective suit.

As further indicated above, in a second exemplary embodiment, the PPE ensemble of the present invention comprises: an optionally launderable protective hood that is detachably affixed to and forms a gas-restrictive seal with an air dispersion protective face shield assembly; and a protective headgear worn under the hood. In a preferred embodiment, the PPE ensemble further comprises an air-supplied protective suit having an air supply inlet/outlet assembly, wherein the air dispersion protective face shield assembly is releasably coupled to the air supply inlet/outlet assembly of the protective suit.

Figure 1:
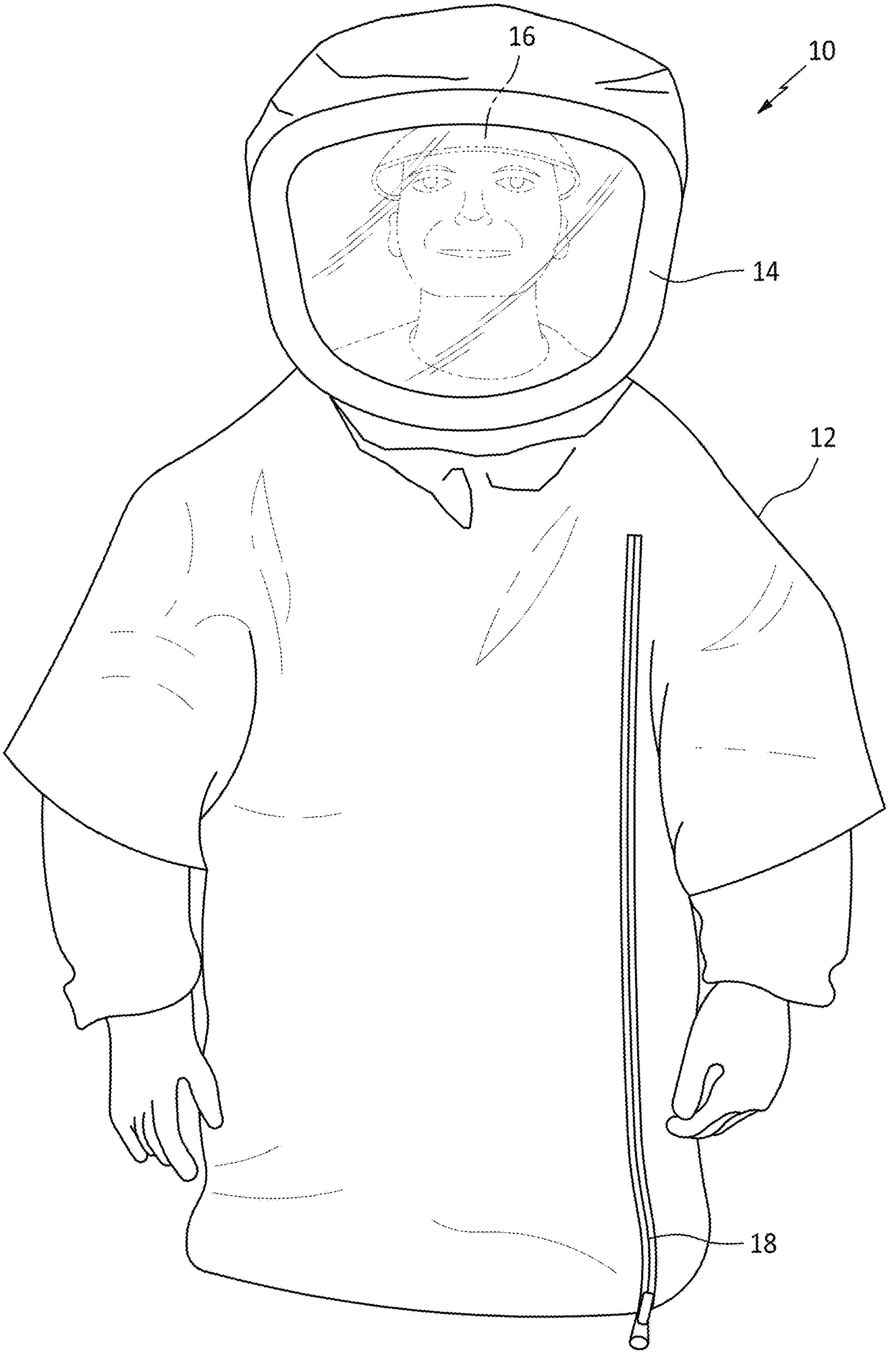
FIG. 1 is a frontal view of the PPE ensemble of the present invention, which includes a launderable protective hood in the form of a smock style top, the protective face shield assembly attached to, and forming a gas-restrictive seal with the protective hood, and protective headgear.

Referring now to the drawings in detail, the PPE ensemble of the present invention is shown in FIG. 1 generally at 10. The inventive PPE ensemble comprises: a launderable protective hood 12 in the form of a smock style top, which is detachably affixed to and forms a gas-restrictive seal with a protective face shield assembly 14; and a protective headgear 16, worn under the hood.

As noted above, the inventive PPE ensemble may further comprise an air-supplied protective suit (not shown). By way of this embodiment, pressurized air is supplied via an air supply inlet/outlet assembly located on, within, or near the protective suit to both an interior space(s) of the protective suit and to either the protective headgear (first exemplary embodiment), or the air dispersion protective face shield assembly (second exemplary embodiment). Unless otherwise specified, the features and components, other than the air dispersion protective headgear and the air dispersion protective face shield assembly, described below in the detailed description relate to both the first and the second exemplary embodiments.

Launderable Protective Hood

The launderable protective hood of the present invention is oversized relative to the spatial envelope of a wearer's head and receives air during use which fills the hood. The air may be received from any suitable source and in an exemplary embodiment in which a protective suit forms part of the inventive ensemble, the hood receives air exiting the protective suit at or around the shoulders via an exhaust port. The oversized nature of the hood design provides a less constrained and intrusive space for the wearer.

The design of the protective hood is such that as soon as the air from, for example, the protective suit exhausts into and fills the hood, the entire hood weight is carried on a wearer's shoulders, not from the protective headgear, which is different than how the weight from prior art single use hoods is carried. When inflated, the hood is not connected to the worker in any way, which obviates neck fatigue and any interference with the protective headgear. This equates to more freedom of movement under the hood and due to the large size of the lens or visor, better visibility.

The protective hood is either manufactured with an opening, or an opening is applied post-manufacture. In a preferred embodiment, a stamping station punches openings into flat stock prior to construction of the protective hoods. The size and shape of the opening approximates the size and shape of the opening formed by the protective face shield assembly 14. The area surrounding the opening is provided with (a) two slits positioned on opposing sides of the opening at approximately the opening's midpoint, and (b) a plurality of pinholes (e.g., five (5) pinholes spaced around the area surrounding the opening), which are used to align the hood material to the protective face shield assembly. The diameter of each pinhole preferably ranges from about 1 to about 10 millimeters (mm), more preferably, from about 2.5 to about 8 mm, most preferably, from about 4 to about 8 mm.

As shown in FIG. 1, the hood may have one or more zippers 18 to facilitate ease of donning and doffing of this garment.

The protective hood may be made from any suitable material including, but not limited to, a thermoplastic resin such as polyethylene, PVC, polyurethane, or other suitable material such as PVC/Nylon Scrim or PVC/Nylon Scrim/PVC material, or a neoprene synthetic rubber. In a preferred embodiment, the protective hood is formed using PVC/Nylon Scrim/PVC material.

Hoods suitable for use in the present invention include the Mark IIIB™ suit hood.

The protective hood is launderable, which greatly reduces the level of radioactive waste to the environment and provides a substantial cost savings to the customer (e.g., a Nuclear Power Plant). The hood withstands being assembled with and disassembled from the protective face shield assembly for laundering at least 50 to 100 times and withstands the rigors of the workplace. It remains sealed through the work sequence and withstands storage in disarrayed conditions stacked in laundry hampers awaiting removal from the work site.

When the air exhausts from a protective suit or other source to the hood, the hood is filled with air. However, as soon as the upper part of the hood is filled, a dead head of air is reached, and air effectively exits through arm sleeves of the hood resulting in reduced or little air flow in the hood. With a dead head of air, the worker is uncomfortable as his/her body heat builds up in the hood and the visor starts to fog from high moisture content (perspiration) buildup in the hood. As will be explained in more detail below, these problems are addressed by either the protective headgear (first exemplary embodiment), or the air dispersion protective face shield assembly (second exemplary embodiment) of the inventive PPE ensemble.

Protective Face Shield Assembly

Figure 2:
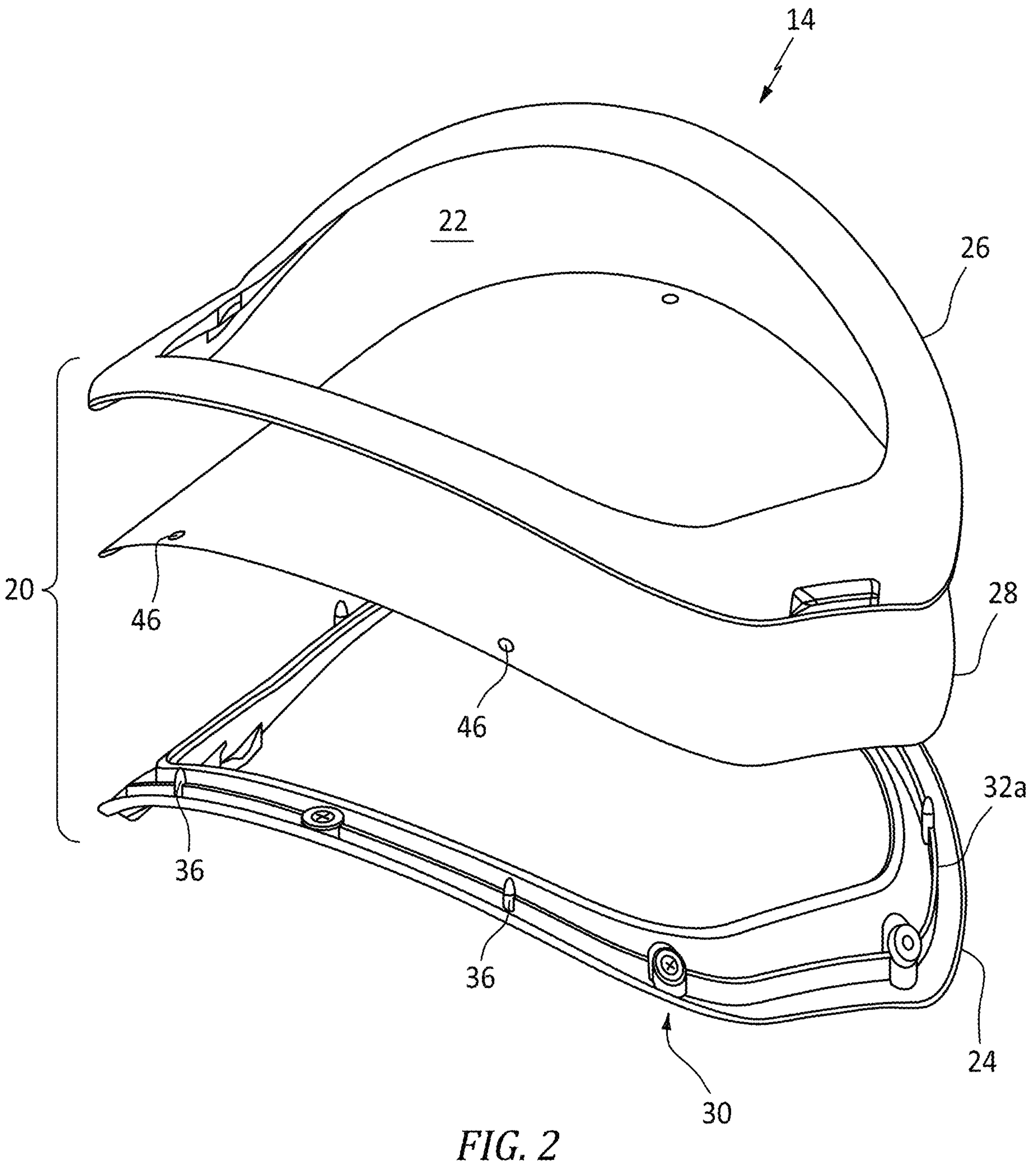
FIG. 2 is an exploded side perspective view of the protective face shield assembly with removable shield or lens of the PPE ensemble of the present invention.

As best shown in FIG. 2, the protective face shield assembly 14 of the inventive PPE ensemble 10, is made up of:

- an arcuate or bow-shaped frame member 20 that defines an opening 22, the frame member being formed from similarly sized inner and outer arcuate frame members 24, 26;
- a shield or lens 28 is removably positioned within the opening 22 defined by the arcuate frame member and between the inner and outer arcuate frame members 24, 26, thereby forming an assembly; and
- means 30 for holding the assembly in gas-restrictive, detachable engagement.

In one exemplary embodiment, the inner and outer arcuate frame members 24, 26 are substantially oval in overall shape having a degree of curvature ranging from greater than about 0 to less than about 90 degrees, with each having a maximum vertical height extending from an upper edge to a lower edge ranging from about 30 to about 36 centimeters (cm), a maximum horizontal width extending from one side edge to an opposing side edge ranging from about 45 to about 54 cm, and a thickness ranging from about 0.6 to about 1.3 cm. The opening measures from about 27 to about 31 cm in total height, and from about 43 to about 51 cm in total width.

The inner or contacting surface of each frame member has a bowed cross-section and one or more stiffening ridges, which extend mid-way along this bowed inner surface (see FIG. 2). The stiffening ridges are integrated with coupling and alignment means. The stiffening ridges serve to strengthen each frame member as well as the coupling and alignment means. Any distortion of the protective face shield assembly that may occur during use by, for example, direct impact of the assembly against an object, will result in tighter registration between the frame members and thus a greater resistance to disassembly.

Figure 3A:
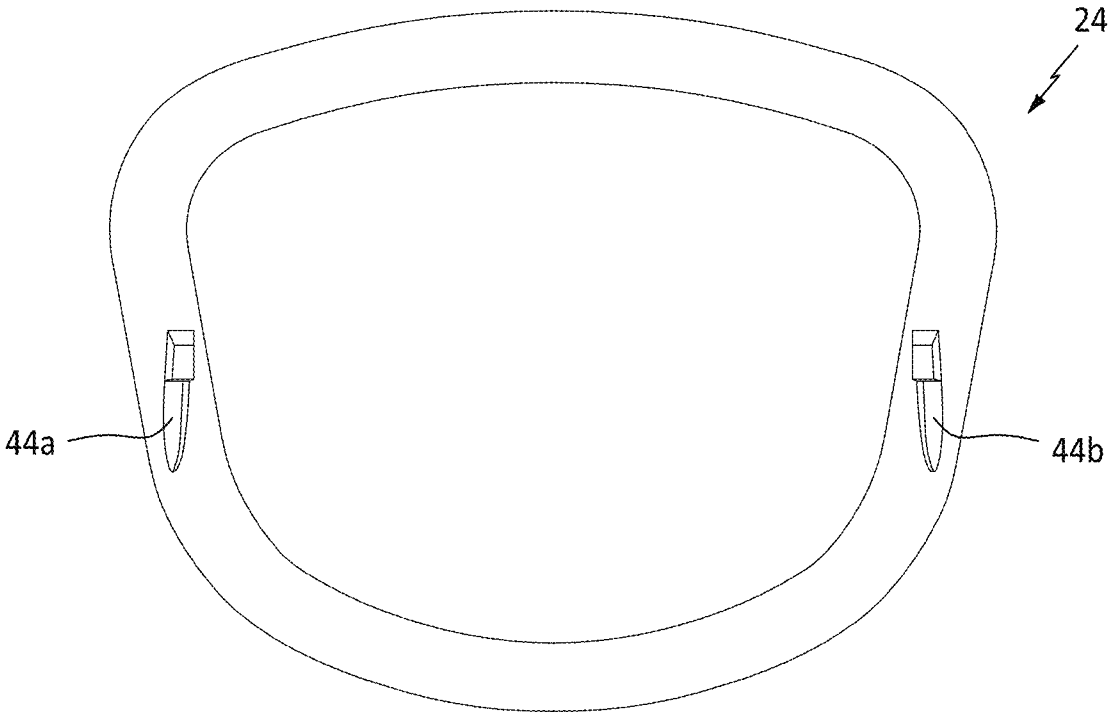
Figure 3B:
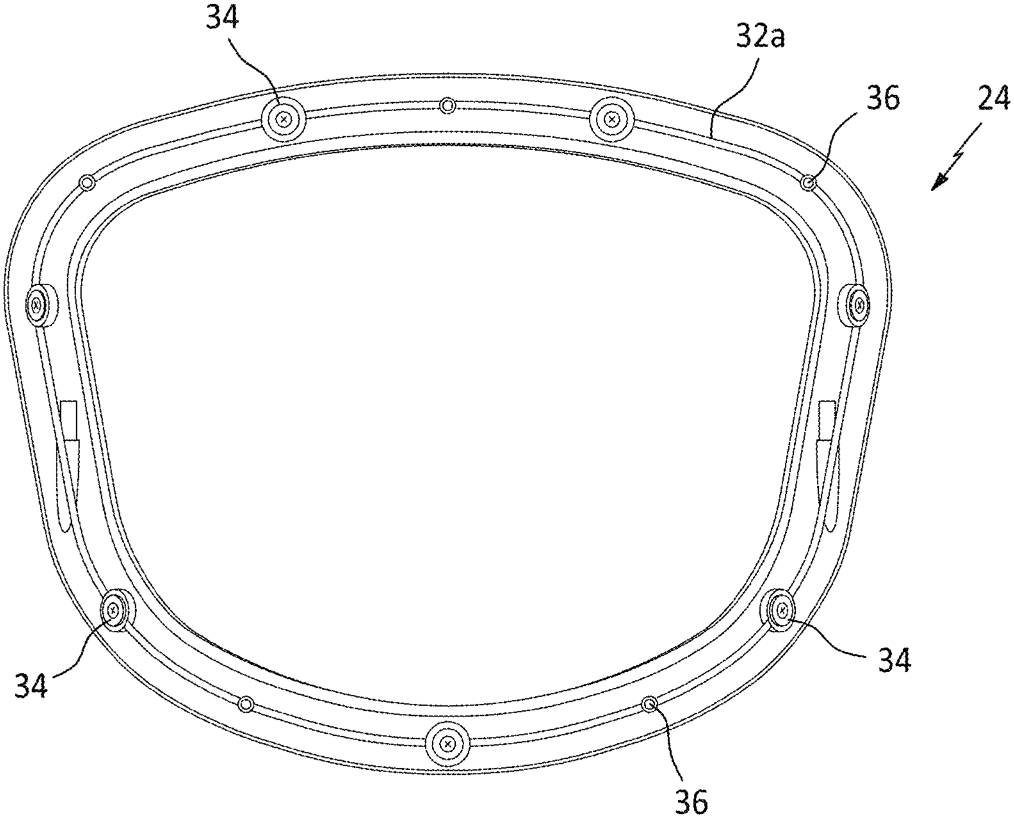

As shown in FIGS. 3A and 3B, the inner surface of the inner arcuate frame member 24 has (i) a plurality of recessed areas or holes 34 formed along ridge 32*a*, which are sized to receive a coupling means (e.g., magnets) and (ii) a plurality of raised areas or pins 36 also formed along the ridge, which are sized to fit into a corresponding recessed area or hole in the inner surface of the outer arcuate frame member 26 for alignment purposes. In an exemplary embodiment, the pins 36 are made from either a plastic or metal or metallic material. Suitable plastic materials include acrylonitrile butadiene styrene (ABS), polycarbonate, engineered plastics such as glass- or fiber-filled polycarbonates, and the like, while suitable metal or metallic materials include stainless steel. The number and size of these alignment structures (i.e., pins, holes) is less/smaller than those used in prior art devices, which facilitates sealing at the interfaces between the inner arcuate frame member, hood material, visor and outer arcuate frame member.

In the first exemplary embodiment, as shown in FIG. 3A, the outer surface of the inner arcuate frame member 24 includes pin sleeves 44*a*, 44*b*, formed into its outer surface to accept the pins of an assembly jig or tool, which is discussed in more detail below.

Figure 9:
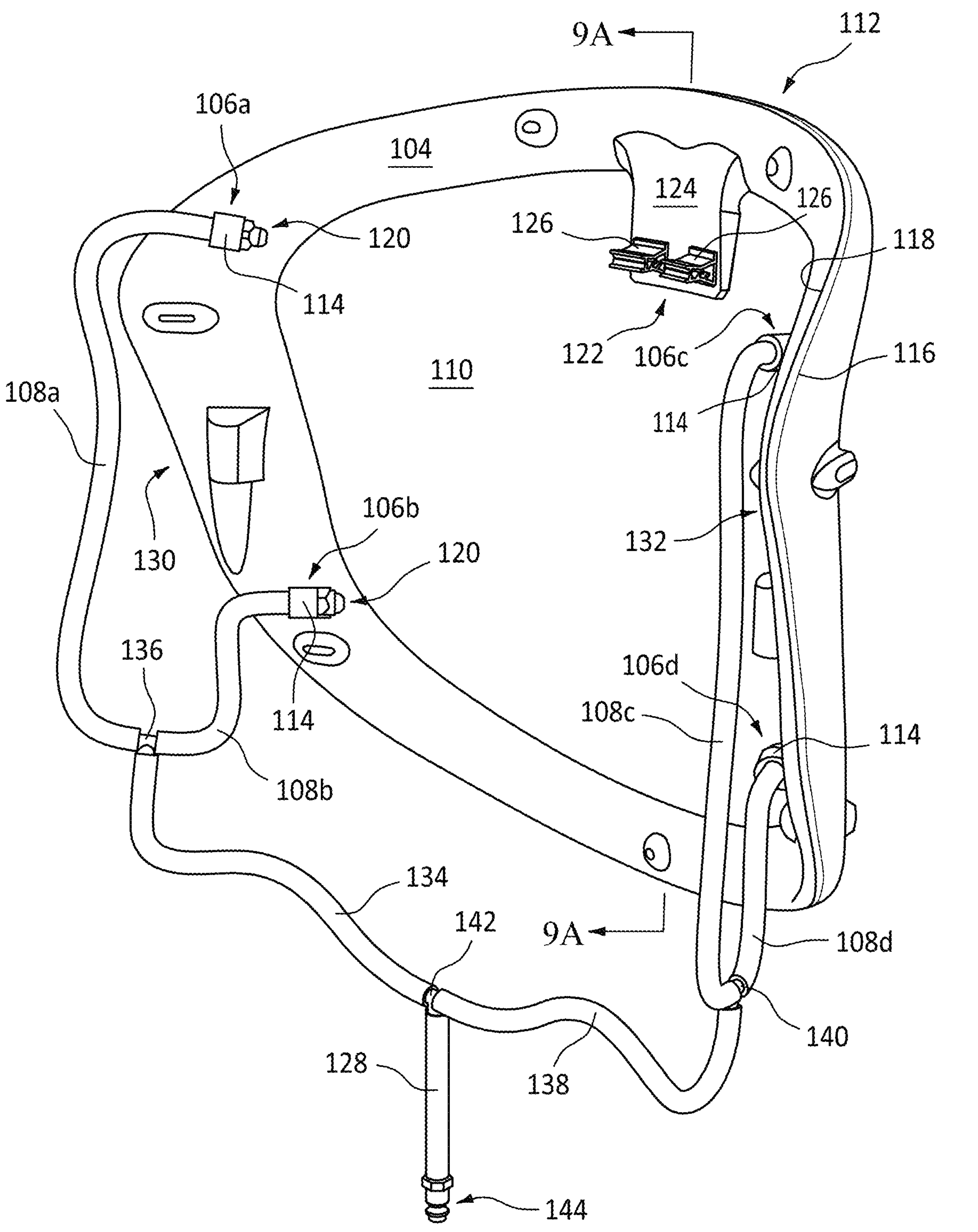
Figure 9B:
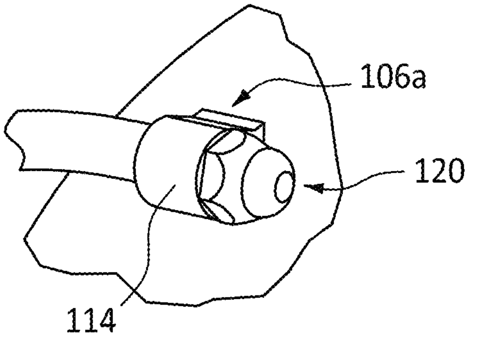
FIG. 9B is an exploded perspective view of an adjustable air nozzle positioned at the end of each flexible air conduit (e.g., air supply hose) positioned on an outer surface of the inner arcuate frame member of the assembly.
Figure 9A:
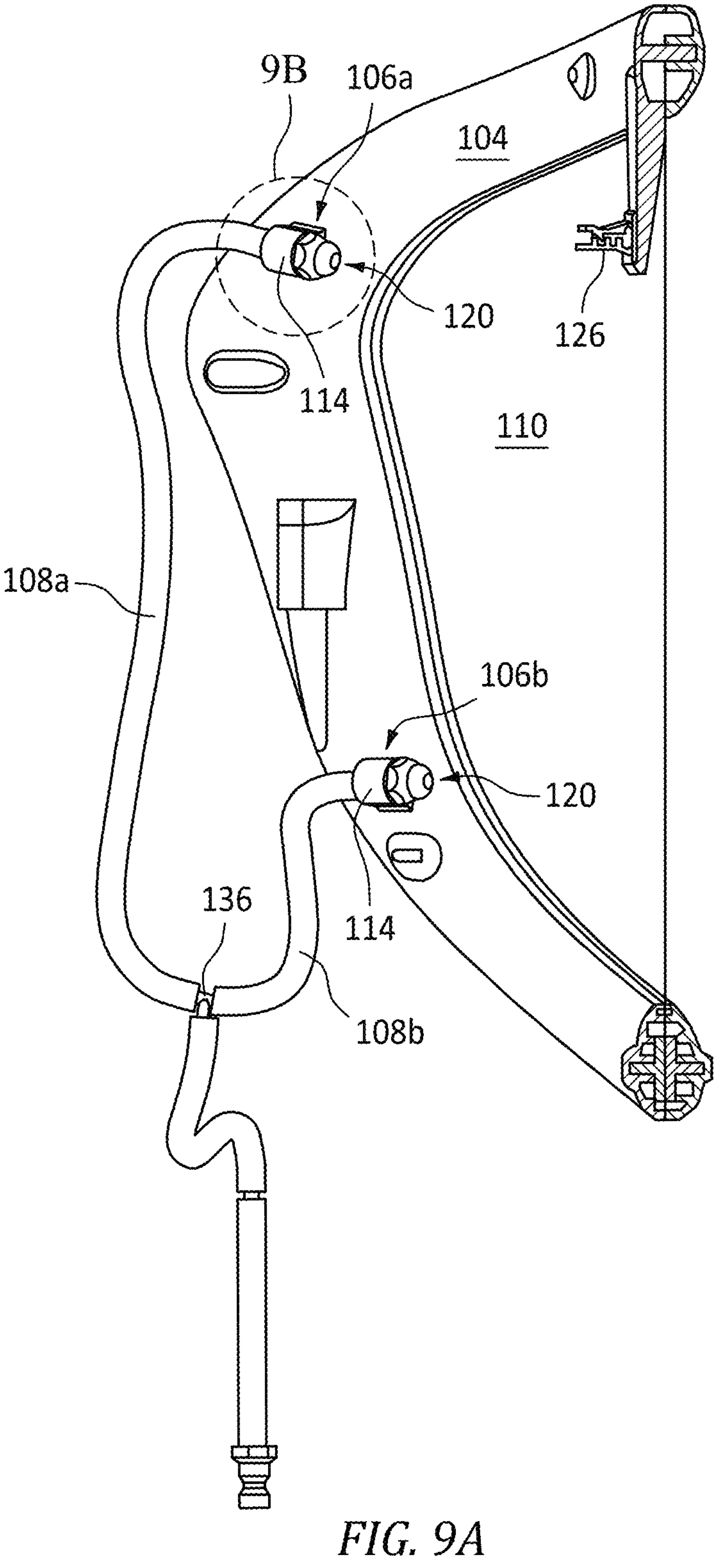
FIG. 9A is a cross-sectional view of the air dispersion protective face shield assembly of FIG. 9 taken along line 9A.

In the second exemplary embodiment, as best shown in FIGS. 9 and 9A, the outer surface 104 of inner arcuate frame member 118 also includes a plurality of securement devices 106 for securing flexible air conduits 108 (e.g., TYGON® tubing) for dispersing breathable air toward a worker and toward the shield or lens 110 of the air dispersion protective face shield assembly 112. Each securement device 106 has a support portion 114 and elastically extendable and oppositely disposed first and second straps (not shown) coupled thereto. In use, the straps of each securement device 106 are urged into a curved or convoluted pathway between the inner surfaces of the arcuate frame members 116, 118. The securement devices 106 serve to secure the flexible air conduits 108, which direct breathable air toward the worker and toward the shield or lens 110. The end of each flexible air conduit 108 is supplied with an adjustable air or spreader nozzle 120 (FIG. 9B), which allows the worker to adjust the flow rate, thereby regulating the amount of air that passes through the nozzle toward the worker and toward the shield or lens 110. The outer surface 104 of the inner arcuate frame member 118 also includes a means 122 (e.g., a downwardly extending mount post 124 coupled with one or more standoff clips 126) for securing a bill or brim of a protective headgear (e.g., hard hat).

Referring again to FIGS. 9 and 9A, air supplied through flexible air conduits 108*a*, 108*b*, 108*c*, 108*d*, toward the worker and toward the shield or lens 110 emanates from a single air supply hose 128. In particular, and in a preferred embodiment, the flexible air conduits 108*a*, 108*b*, leading from one side 130 of the outer surface 104 of the inner arcuate frame member 118 are both fluidly combined with a first flexible air conduit 134, using, for example, a barbed tee fitting 136. The flexible air conduits 108*c*, 108*d*, leading from an opposing side 132 of the outer surface 104 of the inner arcuate frame member 118 are fluidly combined with a second flexible air conduit 138, using a barbed tee fitting 140. First and second flexible air conduits 134 and 138 are fluidly combined with the single air supply hose 128 using a barbed tee fitting 142. The single air supply hose 128 terminates in a quick release coupling 144.

The single air supply hose 128 is directly or indirectly connected via the quick release coupling 144 to an air supply inlet/outlet assembly of the protective suit.

Figure 4A:
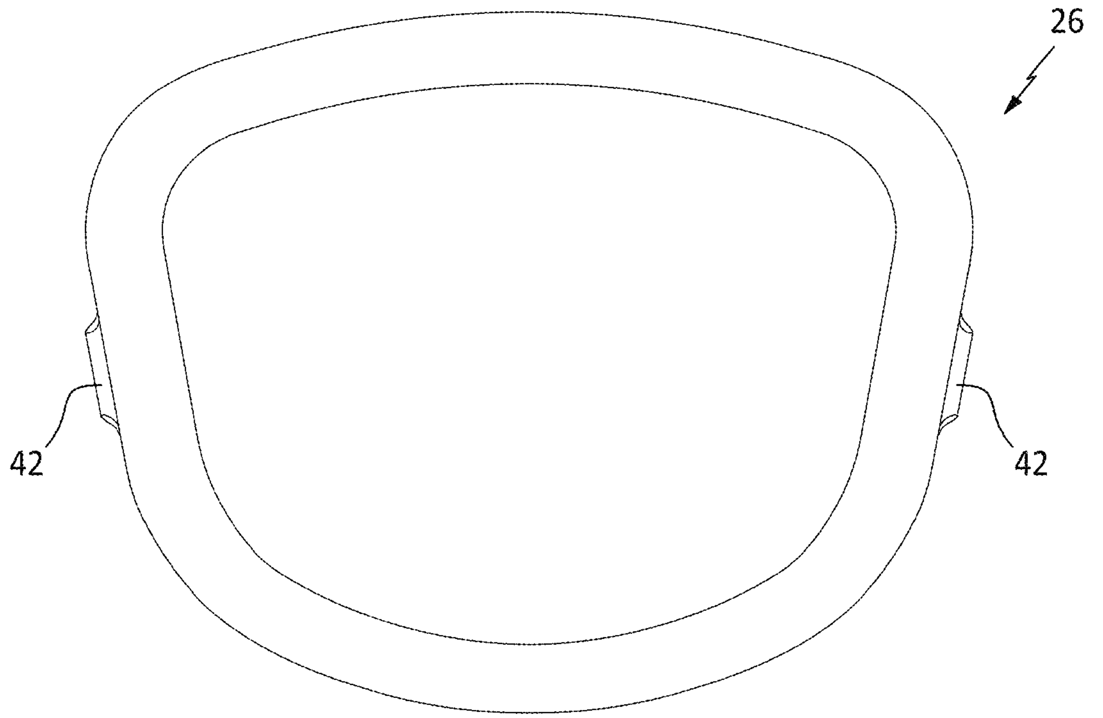
Figure 4B:
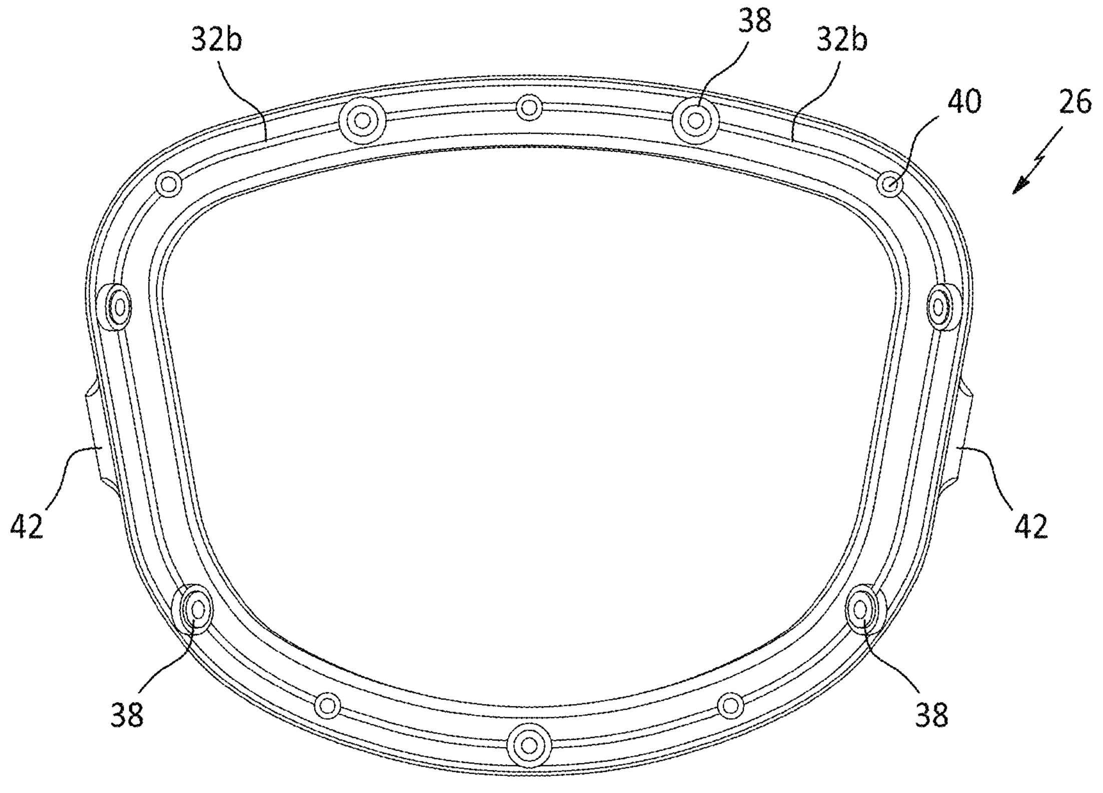

As shown in FIGS. 4A and 4B, the outer arcuate frame member 26 has a plurality of two different sized recessed areas or holes formed along ridge 32*b*. The larger recessed areas 38 are sized to receive a coupling means (e.g., magnets) while the smaller recessed areas 40 are used to register the two frame members 24, 26 and are sized to receive the raised pins 36 of the inner arcuate frame member 24. Finger grips 42 are shown as added to the outer actuate frame member 26 for ease of handling the assembly during assembly and disassembly.

In one exemplary embodiment, the frame members each have from about 4 to about 9 (preferably from about 6 to about 8) recessed areas or holes to receive magnets and from about 3 to about 7 (preferably from about 4 to about 6) raised areas or corresponding recessed areas to align the frame members.

Referring back to FIG. 2, in a preferred embodiment, the means 30 for holding the protective face shield assembly 14 in gas-restrictive, detachable engagement are coupling devices in the form of magnets with very strong magnetic strength properties. In a more preferred embodiment, neodymium (N42 grade) magnets are used with this invention. These are sometimes referred to as "super magnets". Sintered neodymium-iron-boron (Nd—Fe—B) magnets are a member of the rare earth magnet family and are one of the most powerful permanent magnets known. An advantage of this type of magnet is that they are very resistant to demagnetization and can be expected to hold their magnetism for the lifetime of the PPE ensemble. It should be appreciated by those skilled in the art that other types of magnets that have similar magnetic strength properties to neodymium magnets could be conceivably used with this invention.

Both single and groups or clusters of magnets are contemplated for use in this invention. In one embodiment, each magnet is a single magnet of the desired strength. In another embodiment, groups of magnets are used with a spacing and configuration to produce a desired magnetic force. The magnets may adopt any shape (e.g., circular, square, rectangular, triangular) and may be substantially planar or curved to conform to the recess shape of the frame member.

In a preferred embodiment, the magnets are single circular magnets affixed to both the outer and inner frame members 24, 26 in a quantity preferably ranging from about 4 to about 10, magnets per frame, more preferably from about 6 to about 8 magnets per frame. The diameter of each circular magnet preferably ranges from about 6 to about 25 mm (more preferably, from about 14 to about 20 mm), while the thickness of each circular magnet preferably ranges from about 1 to about 8 mm (more preferably, from about 2 to about 3 mm).

The inner and outer arcuate frame members 24, 26 may be made from any suitable material including, but not limited to, polymeric materials such as ABS, polycarbonate, polypropylene, engineered plastics such as acetal resins and polycarbonate resins, and the like, as well as metal or metallic materials. In a preferred embodiment, frame members 24, 26 are made using an engineered plastic such as an acetal resin or a polycarbonate resin compounded with, for example, glass, fibers, nanoparticles (nanotubes, nanofillers), fire retardants, or similar additives.

Each frame member may be formed as a single solid piece or as two or more solid pieces (e.g., two interlocking pieces) by injection molding, computer numeric control (CNC) milling, or other suitable manufacturing method.

Shield or Visor

The shield or visor 28 used with the inventive protective face shield assembly 14 is flexible and as shown in FIG. 2 has a size and shape that accommodates or fills the opening 22 formed by the first and second arcuate frame members 24, 26, thereby providing a wider field of vision. The visor 28 is provided with a plurality of through-holes 46 that extend around a perimeter of the visor, the holes lining up with the raised pins 36 of the inner arcuate frame member 24, which serve as alignment guides. Due to the flexibility of the visor, it readily assumes the arcuate shape of the first and second arcuate frame members. The visor may also be provided with a ventilation opening in the form of, for example, a taped flap.

The shield or visor 28 is made from a flexible, transparent sheet-like material, such as polycarbonate resin (e.g., LEXAN' polycarbonate resin), PVC, or other flexible, transparent material, or combinations of materials which are optically clear. The thickness of the shield or visor 28 ranges from about 0.1 to about 1.0 mm (preferably, from about 0.25 to about 0.76 mm).

A thin strip of sealing material (not shown) may optionally extend along the perimeter of the outer surface of the visor 28.

Assembly/Disassembly

During assembly of the protective face shield assembly 14 onto the hood material surrounding the hood opening, the inner arcuate frame member 24 is positioned under the hood opening so that its raised pins line up with the holes in the hood material surrounding the opening. Its raised pins are arranged to extend only through the holes in the lower portion of the hood material. The visor 28 is then positioned over this partial assembly such that the upper portion of the visor is applied directly over the raised pins of the inner arcuate frame member 24, while the lower portion of the visor 28 is fed through the opposing midpoint slits in the hood material and positioned over the lower portion of the hood material. The raised pins will then extend through the holes in the lower portion of the visor 28. Then, the upper portion of the hood material is positioned over the upper portion of the visor 28 and through the raised pins. This provides an actual natural water resistance when water flows over the visor from top to bottom. The outer arcuate frame member is then applied over and in registration with the resulting assembly with its coupling means forming a gas-restrictive seal between the inner arcuate frame member, hood material, visor and outer arcuate frame member.

During disassembly of the protective face shield assembly from the hood material surrounding the hood opening, the grip feature 42 on the outer arcuate frame member 26 may be used to remove this frame member from the assembly. The visor 28 and inner arcuate frame member 24 may then be easily removed from the hood material surrounding the opening.

Assembly Jig

Figure 5:
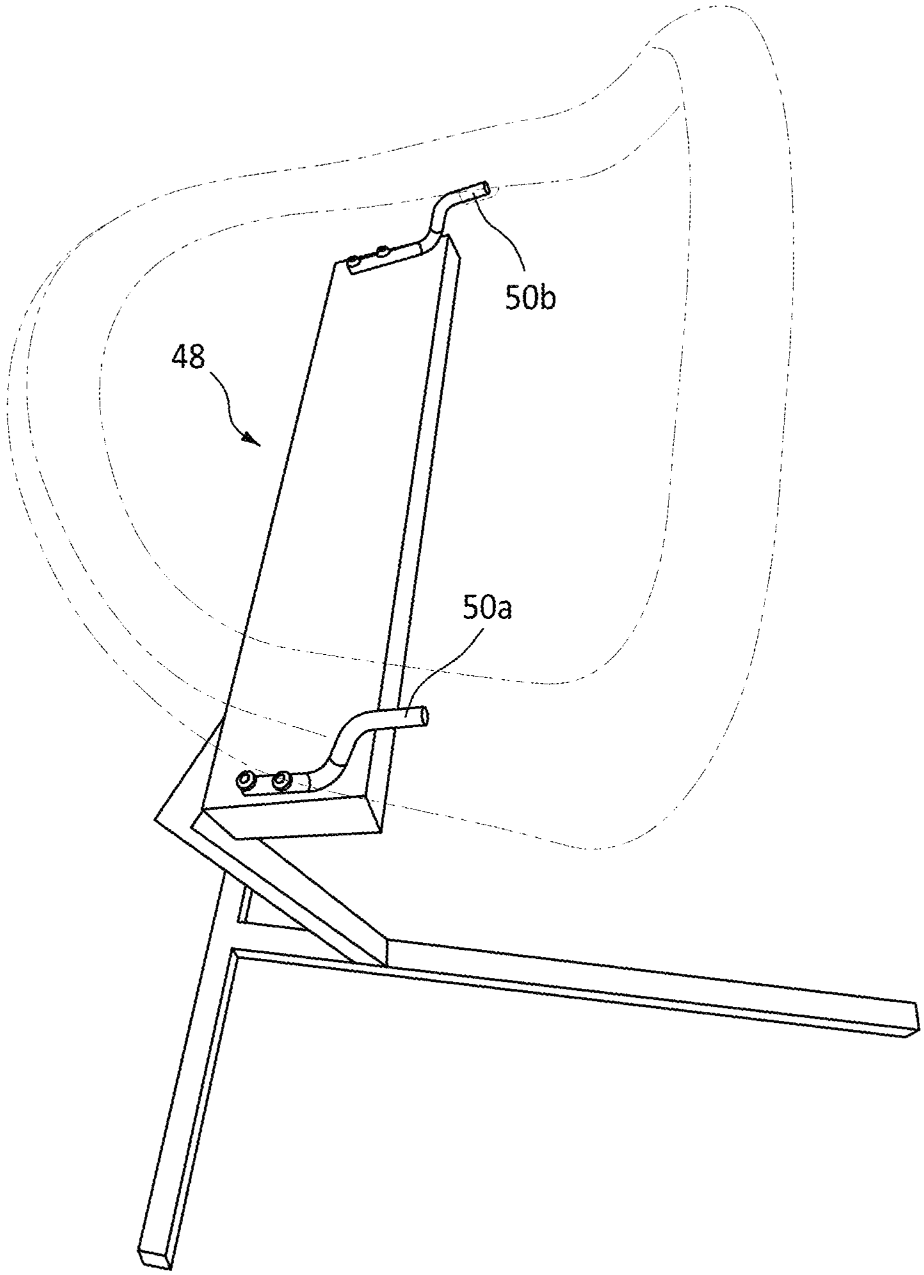
FIG. 5 is a top perspective view of the assembly jig, which is used to assemble and disassemble the protective face shield assembly of the present invention.

The present inventors have also devised a jig or tool to facilitate assembly and disassembly of the protective face shield assembly 14 on or from the hood material. As shown in FIG. 5, the jig or tool 48 holds the inner arcuate frame member 24 in a fixed position via two pins 50*a*, 50*b*, which fit into the pin sleeves 44*a*, 44*b*, formed in the frame member 24. The pins 50*a*, 50*b*, and pin sleeves 44*a*, 44*b*, prevent distortion during assembly and disassembly of the arcuate frame members.

Launderable Aspect of Hood

After being worn, the smock style top shown in FIG. 1 is sent to a laundry where the visor is removed, and the top and visor washed and decontaminated in separate operations using different means. As will be readily appreciated by those skilled in the art, the smock style top can be washed more vigorously than the visor. The visor is washed to remove any contaminants and to preserve the visual clarity and structural integrity thereof. The smock style top and visor are then rejoined for subsequent use. As noted above, the visor may also be replaced instead of cleaned and reinstalled.

Air-Supplied Protective Suit

A variety of protective suits have been developed to protect wearers against the adverse effects of chemicals as well as biological, nuclear and other environmental contaminants or conditions. The design aspects of these highly specialized suits depend largely upon their specific applications. However, if just trace amounts of toxic vapors penetrate the protective suit, the result can be severe injury or death. Consequently, most all such suits employ an external pressurized air source (typically supplied via a wall, post, or floor mounted air station) for introducing pressurized clean filtered breathable air into the protective suit. The positive pressure offers additional protection in the event of a defect or puncture in the suit. Should the suit's integrity be compromised, air would be forced out instead of being pulled into the suit.

As previously noted, an example of a suitable protective suit for use in this invention is the MARK IIIB™ protective suit. The MARK IIIB™ protective suit is composed of a PVC coated polyester that is double sealed, which serves to ensure a consistent positive pressure within the suit thereby protecting the wearer from contamination.

Air Supply Inlet/Outlet Assembly

Figure 6A:
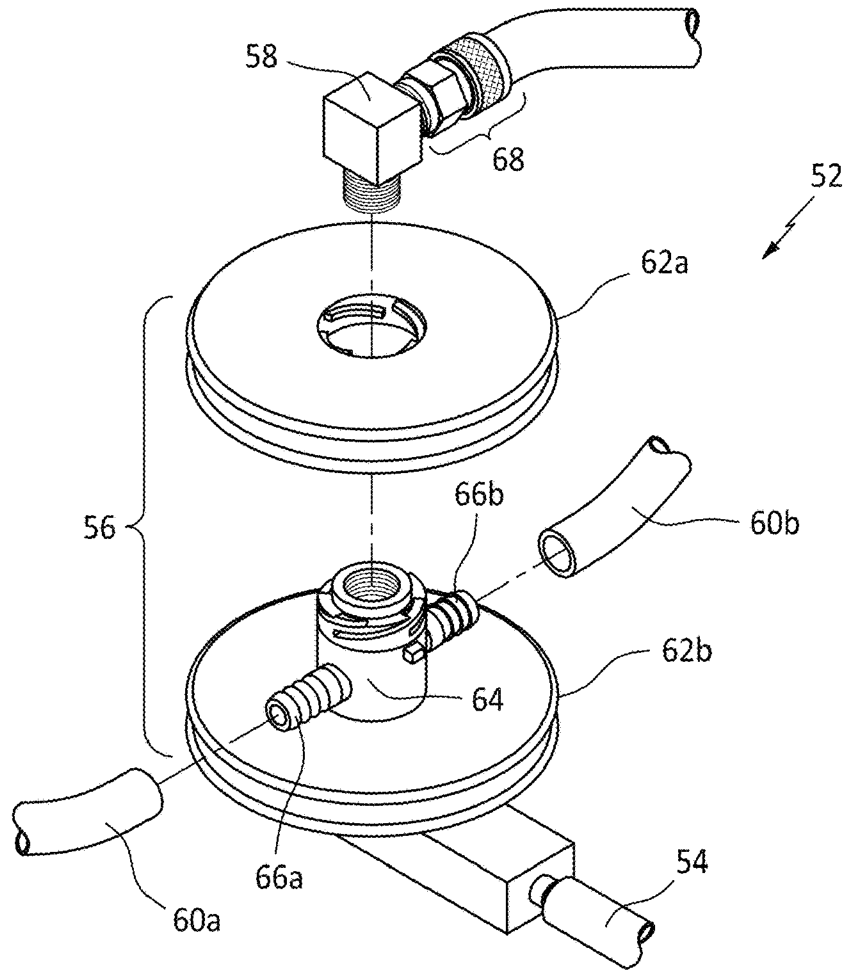
Figure 6B:
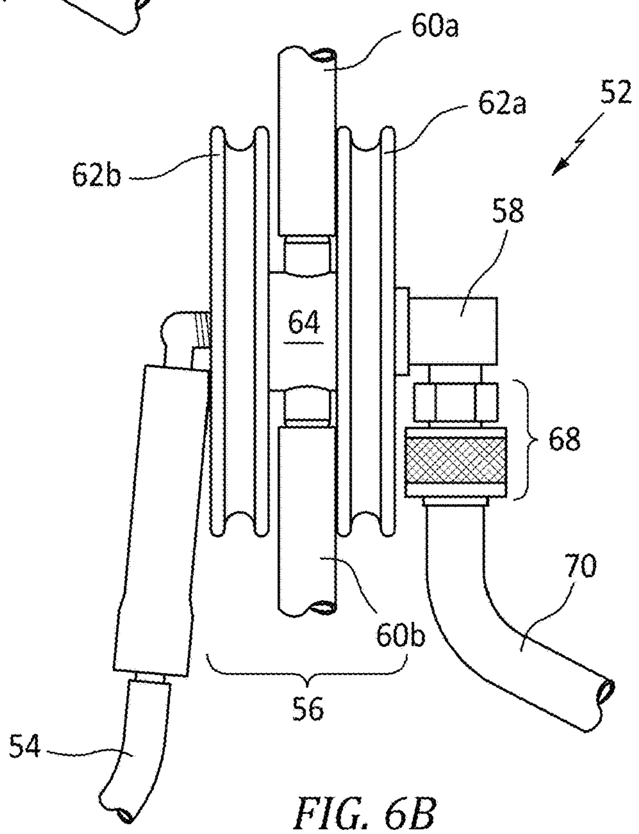
FIG. 6B is a side perspective view of the assembly.

The protective suit is plugged into clean filtered breathable air through an air supply inlet/outlet assembly 52, which is in fluid communication with a breathable air source 54, as shown in FIGS. 6A and 6B. The air supply inlet/outlet assembly 52 includes a bobbin assembly 56, which serves to direct breathing air to both the protective suit and either the protective headgear 16, or the air dispersion protective face shield assembly, and an air control device 68. As air flows through the bobbin 56, the bobbin diverts air to: (a) plastic tubing or hose (e.g., TYGON® tubing) 60*a*, 60*b*, which then distributes air to the wrists and ankles of the protective suit; and (b) the air control device (e.g., a connector fitting) 68, connected to elbow fitting 58, which controls the amount of air that is diverted along tubing or hose (e.g., TYGON® tubing) 70 to either the protective headgear 16, or the air dispersion protective face shield assembly.

Bobbins may vary somewhat in design, but in this exemplary embodiment, the bobbin 56, which measures from about 20 to about 60 mm (preferably, from about 30 to about 40 mm) in total height, is made up of two "bobbin-like" cylindrical bodies 62*a*, 62*b*, each having an enclosed reinforced midportion positioned between two flat surfaces and a central through hole. The "bobbin-like" cylindrical bodies 62*a*, 62*b*, each measure from about 20 to about 140 mm in diameter (preferably, from about 80 to about 90 mm), with the central through hole measuring from about 6 to about 30 mm (preferably, from about 10 to about 20 mm) in diameter. The central through holes are connected by way of a threaded tubular member 64, which measures from about 6 to about 40 mm (preferably, from about 25 to about 30 mm) in total height. Threaded tubular member 64 extends from the through hole in the lower cylindrical body 62*b* and threads onto the through hole in the upper cylindrical body 62*a* forming a channel therethrough. Two plastic (or one metal (not shown)) barbed tube fittings 66*a*, 66*b*, extend perpendicularly from the threaded tubular member 64 forming another channel. This channel serves to divert breathing air from the breathable air source 54 through the lower cylindrical body 62*b* and threaded tubular member 64 through the plastic or metal barbed tube fittings 66*a*, 66*b*, to hoses 60*a*, 60*b*, that then distribute air to the wrists and ankles of the plastic suit.

The bobbin 56 may be made using any suitable material. In a preferred embodiment, the bobbin is made using ultra-high-density polyethylene.

The elbow fitting 58 fluidly connects (e.g., threads, snaps or clips) onto the through hole or channel of tubular member 64 of bobbin 56 and is connected to either the protective headgear 16, or the air dispersion protective face shield assembly 112, by way of the air control device 68 and tubing or hose 70. The air control device 68 is configured to allow a portion of air from the breathable air source 54 (preferably, greater than or equal to about 5 percent (%), more preferably, from about 5 to about 20% of air, most preferably, from about 8 to about 12% of air) to be directed to either the protective headgear 16, or the air dispersion protective face shield assembly 112.

The air control device 68 has a central orifice or opening that is sized in terms of length and diameter to meet a set flow rate, thereby regulating the amount of air that passes through the device.

In an exemplary embodiment, the air supply inlet/outlet assembly 52 delivers twenty-eight (28) standard cubic feet per minute (SCFM) (0.80 cubic meters per minute ($m^3$/m) of air to the suit with an inlet supply pressure of 40 to 120 pounds per square inch (PSI) (0.28 to 0.83 megapascal (MPa)) (preferably, 60 to 80 PSI (0.41 to 0.55 MPa), while the air control device 68 allows from about 5 to about 20% (preferably, from about 8 to about 12%) of the inlet air to reach either the protective headgear 16, or the air dispersion protective face shield assembly 112.

Protective Headgear

The protective headgear 16 used in the PPE ensemble of the present invention can be any style or configuration of protective headgear including, but not limited to, safety helmets and hard hats.

Figure 7A:
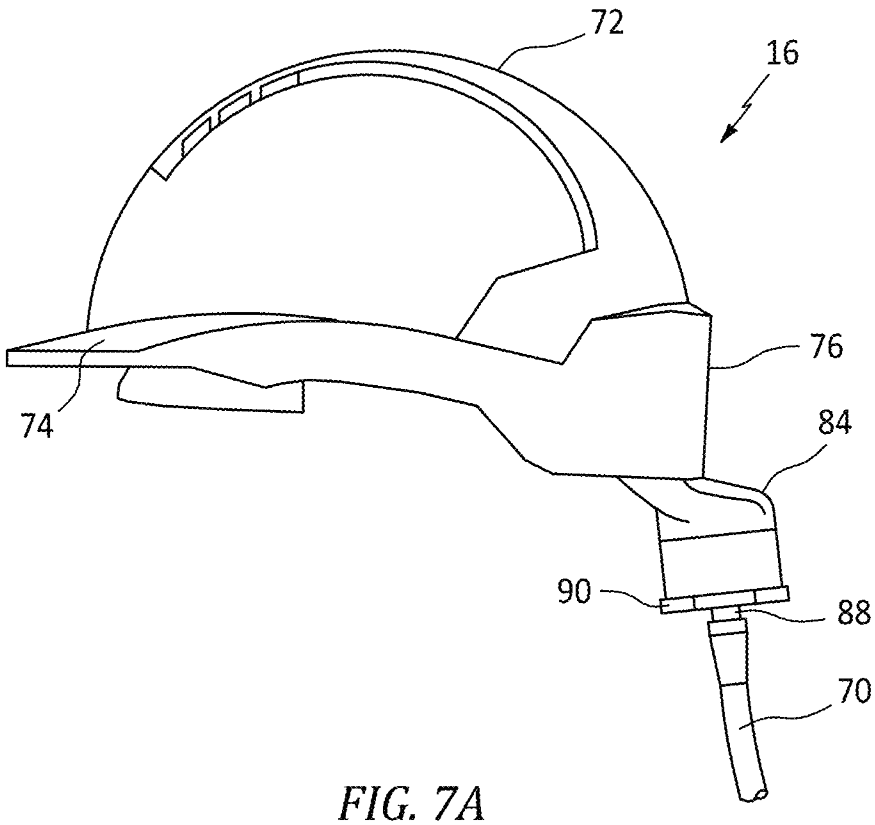
Figure 7B:
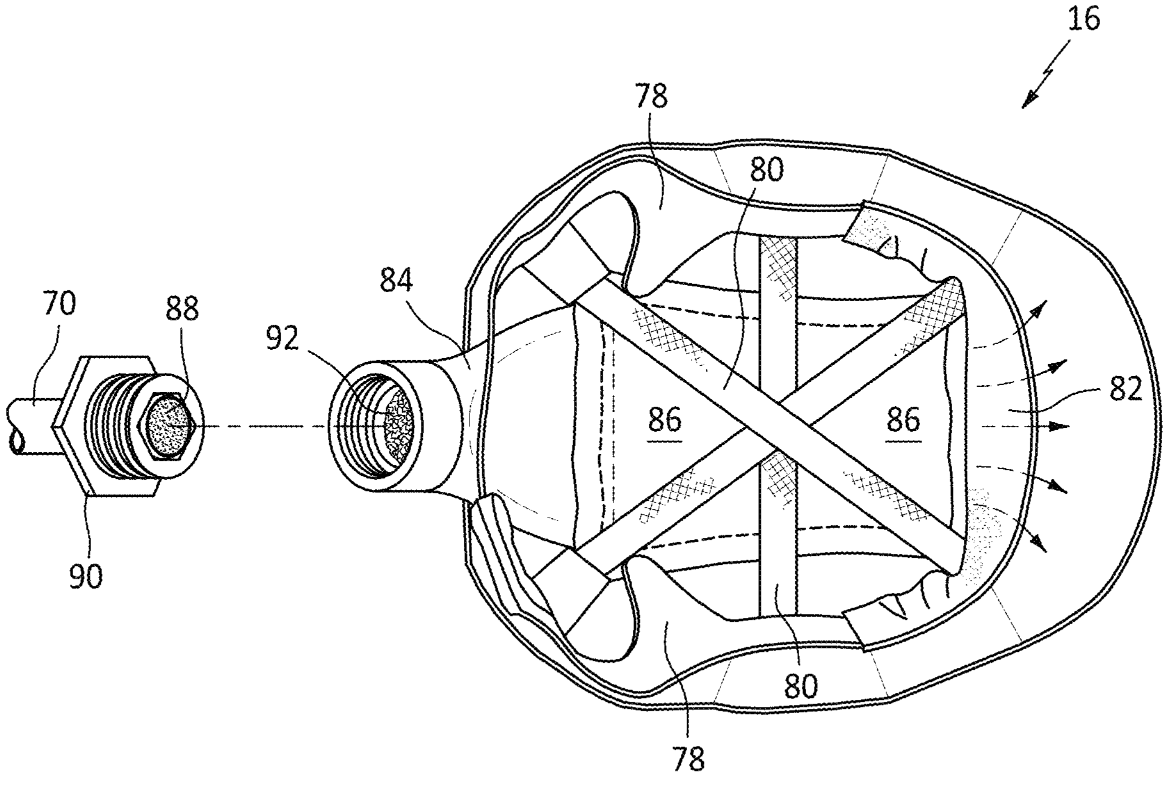
FIG. 7B is a bottom perspective view of the hard hat.

In an exemplary embodiment, as shown in FIGS. 7A and 7B, the protective headgear 16 is a hard hat. In its most basic form, the hard hat includes a shell 72, a bill or brim 74 at the front or face of the shell and a back 76 of the shell. The hard hat has a shock-absorbing lining that incorporates a headband 78 and straps 80 that suspend the shell from about 2.54 to about 3.18 cm away from the head.

In the first exemplary embodiment, an air flow pathway is formed at the back of the shell extending up and over the wearer's head to the front of the hard hat, while in the second exemplary embodiment, the protective headgear does not serve to distribute breathable air and is preferably a standard hardhat.

The air flow pathway of the hat in the first exemplary embodiment may be defined by an internal structure of the hat which may be formed in the shell or underneath the shell, or it may be defined by an external structure that is not contained within the hard hat interior.

In one exemplary embodiment, the air flow pathway of the hat is defined by an internal structure of the hat that extends from an air flow inlet port at the back of the hat and up and over the wearer's head to the front of the hat where the internal structure defines a plurality of exit ports through which air exits the hat and passes in front of the wearer's face with sufficient velocity to reduce the wearer's skin temperature.

In another exemplary embodiment, the air flow pathway is formed underneath the shell in the shape of a circular ring or donut which allows the air flow to sweep down over the wearer's head providing a more even air flow over the wearer's head and keeping the shield or lens of the protective face shield assembly 14 from fogging.

In yet another exemplary embodiment, which is shown in FIGS. 7A and 7B, an air flow pathway 82 is an internal structure formed using an air dispersion or spreader nozzle 84 and a rectangular piece of thin fabric material (e.g., an optionally coated woven material) 86. The air dispersion or spreader nozzle 84 serves to spread the air into a substantially flat or planar spray pattern. In one embodiment, the nozzle 84 has an oval-shaped exhaust opening that measures from about 1 cm by 8 cm. The thin fabric material 86 is detachably engaged to the nozzle 84 and the shell 72 and to the front of the headband 78 forming a channel, such that air from the nozzle 84 is directed from the back of the hard hat along the channel to the front of the hat between the shell 72 and the headband 78, thereby directing air to the front of the wearer's face. The thin fabric material 86, which has a thickness ranging from about 0.05 to about 1.0 mm (preferably, from about 0.1 to about 0.3 mm), may be detachably engaged using any suitable fastening material including, for example, a hook and loop fastener.

The term "hook and loop fastener" as used in the present specification refers to either portion of a fastener comprising two portions, namely a hook portion (e.g., J hook, palm tree hook, mushroom hook) and a portion complementary to the hook portion for example a loop portion such that the two portions are releasably interconnected when brought into contact with each other. Such fasteners are sold, for example, under the trade designations VELCRO and 3M DUAL-LOCK. The use of the term also includes those types of fasteners known as hook and hook fasteners in which there are opposing portions of interlockable hooks. The term also includes any other touch and grip type fastener of the type in which temporary interconnection is achieved when the two components thereof are brought into contact with each other.

Tubing or hose 70 from the air supply inlet/outlet assembly 52, which is housed on, within, or near the protective suit, is fed onto a barbed tube fitting of an air filter 88, which has been threaded onto an inside channel of an air duct adapter 90. The air dispersion nozzle 84 is threaded onto the outside of the air duct adapter 90, the air dispersion nozzle 84 containing sound dampening material 92 on either or both the inlet side and the exhaust side, which reduces the sound level. Suitable sound dampening materials 92 include foam, rubber, certain fabrics and any other suitable material. The degree of dampening may be varied by altering the material, its width or thickness, or its density. In one exemplary embodiment, the sound dampening material is an open cell foam having a thickness ranging from about 6 to about 40 mm, and a density ranging from about 6 pores per inch (PPI) to about 120 PPI (from about 3 pores per centimeter (PPC) to about 55 PPC), the sound level within the protective headgear 16 being reduced to less than or equal to approximately 80 A-weighted decibels (dBA), which is measured using a sound level meter comprising a measuring microphone, whereby the sound level meter determines the sound pressure level at or near a wearer's ear.

Figure 8:
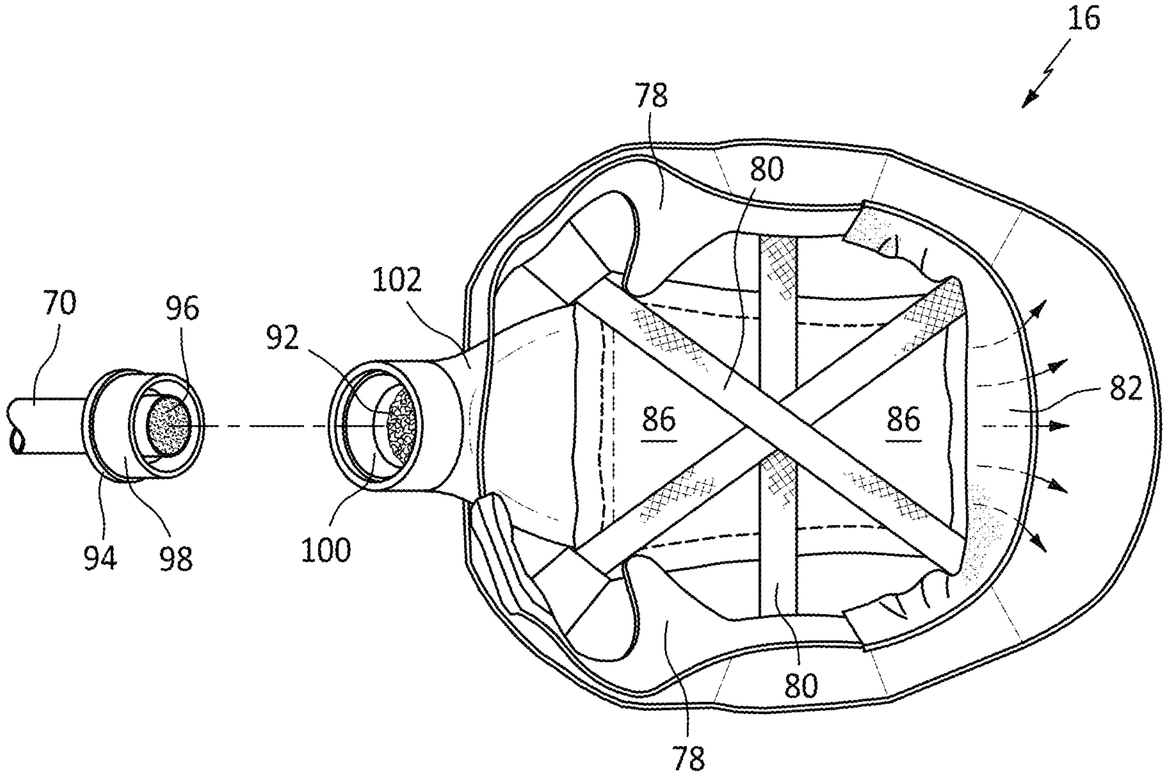
FIG. 8 is a bottom perspective view of another exemplary embodiment of the protective headgear in the form of a hard hat of the first exemplary embodiment of the inventive PPE ensemble.

In an alternative embodiment, which is shown in FIG. 8, the air duct adapter and the air dispersion nozzle, which are described above as both being threaded parts, are replaced with non-threaded parts. The air duct adapter is replaced with a substantially circular, recessed coupler (e.g., a substantially circular, recessed, plastic coupler) 94 with a through hole (not shown). An air filter 96 with a shaft having an upper threaded portion and a lower portion in the form of a barbed tube fitting (not shown) is positioned down and threaded onto an inside channel (i.e., the through hole) of coupler 94, with its barbed tube fitting extending through and beyond the through hole for attachment to tubing or hose 70. The outside surface 98 of the coupler 94 is affixed to the non-threaded, inside surface of the inlet side 100 of air dispersion nozzle 102 using any suitable means including, but not limited to, securing the parts together with a hot melt or curable (e.g., an ultraviolet (UV) curing) adhesive.

As noted above, by way of the second exemplary embodiment of the present invention, instead of air being distributed by the protective headgear, air is distributed by way of the air dispersion protective face shield assembly.

By way of both embodiments, increased wearer comfort is achieved by maintaining or cooling the skin temperature of the wearer and thus reducing or eliminating lens fogging in the protective hood. The result is an increase in the "jump" time, essentially increasing worker productivity by allowing for an increase in the allotted amount of work time as well as expanding the scope of work that can be completed within this allotted amount of time.

In addition to the inventive PPE ensemble, the present invention also provides a method for reducing fogging of a shield or lens in the protective face shield assembly of the PPE ensemble, the method comprising:

diverting a portion of air from the air supply inlet/outlet assembly of the protective suit to either the protective headgear, or the air dispersion protective face shield assembly; and directing the diverted air toward either a worker's head and face, or toward the worker and the shield or lens of the air dispersion protective face shield assembly, thereby cooling the worker's face and reducing worker perspiration and concomitant fogging of the shield or lens.

Further provided by way of the present invention is a method for reducing worker fatigue when wearing headgear under a protective hood of the PPE ensemble, the method comprising:

diverting a portion of air from the air supply inlet/outlet assembly of the protective suit to either the protective headgear, or the air dispersion protective face shield assembly; and directing the diverted air toward either a worker's head and face, or toward the worker and the shield or lens of the air dispersion protective face shield assembly, thereby cooling the worker's face and reducing worker fatigue.

While the invention is described in connection with certain preferred embodiments, it is understood that it is not intended to limit the invention to those embodiments. Rather, it is intended to cover all alternatives, modifications and equivalents as may be included within the spirit and scope of the invention as defined by the appended claims. For example, the air that is conveyed to the protective headgear 16 may be sourced from other than a protective suit. The source of breathable air may be a cylinder of compressed air, a compressed air network (or ring main) installed within a building, or a large tank of compressed air.

What is claimed is:

1. A personal protective equipment ensemble that serves to shield or isolate workers entering radiation control areas from chemical, physical, and biological hazards, the personal protective equipment ensemble comprising:

(i) an air dispersion protective face shield assembly that includes a plurality of securement devices, each securement device of the plurality of securement devices securing an end of a flexible air conduit supplied with an adjustable nozzle configured to allow a worker to adjust a flow rate, the respective nozzle being adjacent to the respective securement device and serving to direct breathable air toward the worker and toward a shield or visor of the air dispersion protective face shield assembly, each securement device of the plurality of securement devices are elastically extendable; and (ii) a protective hood that is affixed to and forms a gas-restrictive seal with the air dispersion protective face shield assembly, wherein the air dispersion protective face shield assembly comprises:

a. an arcuate frame member that defines an opening, the frame member being formed from inner and outer arcuate frame members, wherein an outer surface of the inner arcuate frame member includes the plurality of securement devices, wherein the plurality of securement devices extend around a perimeter of, and are fixably attached to, the inner arcuate frame member for securing the ends of the flexible air conduits;

b. the shield or visor positioned within the opening defined by the arcuate frame member and between the inner and outer arcuate frame members; and c. means for holding the inner arcuate frame member, the outer arcuate frame member and the visor in gas-restrictive, detachable engagement, and wherein an upper left corner of the inner arcuate frame member comprises a first securement device of the plurality of securement devices for securing a first adjustable nozzle of the plurality of adjustable nozzles, an upper right corner of the inner arcuate frame member comprises a second securement device of the plurality of securement devices for securing a second adjustable nozzle of the plurality of adjustable nozzles, a lower right corner of the inner arcuate frame member comprises a third securement device of the plurality of securement devices for securing a third adjustable nozzle of the plurality of adjustable nozzles and a lower left corner of the inner arcuate frame member comprises a fourth securement device of the plurality of securement devices for securing a fourth adjustable nozzle of the plurality of adjustable nozzles.

2. The personal protective equipment ensemble of claim 1, wherein the means for holding the assembly in gas-restrictive, detachable engagement are coupling devices in the form of magnets.

3. The personal protective equipment ensemble of claim 1, wherein the respective adjustable nozzle is affixed to the end of the respective flexible air conduit, allowing the worker to adjust the flow rate, thereby regulating the amount of air that passes through the respective nozzle toward the worker and toward the shield or visor of the air dispersion protective face shield assembly.

4. The personal protective equipment ensemble of claim 1, wherein the outer surface of the inner arcuate frame member further includes means for securing a bill or brim of a protective headgear.

5. A method for laundering the protective hood of the personal protective equipment ensemble of claim 1, the method comprising: disassembling and removing the protective face shield assembly from the protective hood; laundering the protective hood; either separately cleaning or replacing the shield or visor; and then reassembling the protective face shield assembly onto the protective hood.

6. A personal protective equipment ensemble that serves to shield or isolate workers entering radiation control areas from chemical, physical, and biological hazards, the personal protective equipment ensemble comprising:

(i) a protective suit, wherein pressurized air is supplied through an air supply inlet and outlet assembly to an interior space of the protective suit;

(ii) a protective hood that is affixed to and forms a gas-restrictive seal with an air dispersion protective face shield assembly that includes a plurality of securement devices, each securement device of the plurality of securement devices securing an end of a flexible air conduit supplied with an adjustable nozzle configured to allow a worker to adjust a flow rate, the respective nozzle being adjacent to the respective securement device and serving to direct breathable air toward the worker and toward a shield or visor of the air dispersion protective face shield assembly, wherein the air dispersion protective face shield assembly is releasably coupled to the air supply inlet and outlet assembly of the protective suit, each securement device of the plurality of securement devices are elastically extendable; and (iii) a protective headgear, the protective headgear is worn underneath the protective hood, wherein the air dispersion protective face shield assembly comprises:

a. an arcuate frame member that defines an opening, the frame member being formed from inner and outer arcuate frame members, wherein an outer surface of the inner arcuate frame member includes the plurality of securement devices, wherein the plurality of securement devices extend around a perimeter of, and are fixably attached to, the inner arcuate frame member for securing the ends of the flexible air conduits;

b. the shield or visor positioned within the opening defined by the arcuate frame member and between the inner and outer arcuate frame members; and c. means for holding the inner arcuate frame member, the outer arcuate frame member and the visor in gas-restrictive, detachable engagement, and wherein an upper left corner of the inner arcuate frame member comprises a first securement device of the plurality of securement devices for securing a first adjustable nozzle of the plurality of adjustable nozzles, an upper right corner of the inner arcuate frame member comprises a second securement device of the plurality of securement devices for securing a second adjustable nozzle of the plurality of adjustable nozzles, a lower right corner of the inner arcuate frame member comprises a third securement device of the plurality of securement devices for securing a third adjustable nozzle of the plurality of adjustable nozzles, and a lower left corner of the inner arcuate frame member comprises a fourth securement device of the plurality of securement devices for securing a fourth adjustable nozzle of the plurality of adjustable nozzles.

7. The personal protective equipment ensemble of claim 6, wherein the air supply inlet and outlet assembly is in fluid communication with a breathing air supply, the protective suit, and the air dispersion protective face shield assembly, wherein the air supply inlet and outlet assembly comprises a bobbin assembly, which serves to direct inlet breathing air to both the protective suit and the air dispersion protective face shield assembly, and an air control device, which diverts a controlled amount of inlet breathing air to the air dispersion protective face shield assembly.

8. The personal protective equipment ensemble of claim 6, wherein the means for holding the assembly in gas-restrictive, detachable engagement are coupling devices in the form of magnets.

9. The personal protective equipment ensemble of claim 6, wherein the respective adjustable nozzle is affixed to the respective end of the respective flexible air conduit, allowing the worker to adjust the flow rate, thereby regulating the amount of air that passes through the respective nozzle toward the worker and toward the shield or visor of the air dispersion protective face shield assembly.

10. The personal protective equipment ensemble of claim 6, wherein the outer surface of the inner arcuate frame member further includes means for securing a bill or brim of the protective headgear.

11. A method for laundering the protective hood of the personal protective equipment ensemble of claim 6, the method comprising: disassembling and removing the protective face shield assembly from the protective hood; laundering the protective hood; either separately cleaning or replacing the shield or visor; and then reassembling the protective face shield assembly onto the protective hood.

12. A method for reducing fogging of the shield or visor in the protective face shield assembly of the personal protective equipment ensemble of claim 6, the method comprising:

diverting a portion of air from the air supply inlet and outlet assembly to the air dispersion protective face shield assembly; and directing the diverted air toward a worker and toward the shield or visor of the air dispersion protective face shield assembly, thereby cooling the worker's face and reducing worker perspiration and concomitant fogging of the shield or visor.

13. A method for reducing worker fatigue when wearing headgear under the protective hood of the personal protective equipment ensemble of claim 6, the method comprising:

diverting a portion of air from the air supply inlet and outlet assembly to the air dispersion protective face shield assembly; and directing the diverted air toward a worker and toward the shield or visor of the air dispersion protective face shield assembly, thereby cooling the worker's face and reducing worker fatigue.

14. A personal protective equipment ensemble that serves to shield or isolate workers entering radiation control areas from chemical, physical, and biological hazards, the personal protective equipment ensemble comprising:

(i) a protective face shield assembly that includes a shield or visor; and (ii) a protective hood that is affixed to and forms a gas-restrictive seal with the protective face shield assembly;

wherein, the protective face shield assembly comprises:

a. an arcuate frame member that defines an opening, the frame member being formed from the inner and outer arcuate frame members;

b. the shield or visor positioned within the opening defined by the arcuate frame member and between the inner and outer arcuate frame members;

c. means for holding the inner arcuate frame member, the outer arcuate frame member and the visor in gas-restrictive, detachable engagement; and wherein the inner arcuate frame member includes a post extending downward from the outer surface of the inner arcuate frame member, the post comprising an inner surface that tapers towards a bottom end of the post, the inner surface of the post faces the opening defined by the arcuate frame member and the inner surface of the post faces the shield or visor, the post comprising at least one clip extending away from an outer surface of the post, and the at least one clip is configured to clip onto a bill or a brim of a protective headgear that is worn underneath the protective hood.

15. A personal protective equipment ensemble that serves to shield or isolate workers entering radiation control areas from chemical, physical, and biological hazards, the personal protective equipment ensemble comprising:

(i) a protective suit, wherein pressurized air is supplied through an air supply inlet and outlet assembly to an interior space of the protective suit;

(ii) a protective hood that is affixed to and forms a gas restrictive seal with a protective face shield assembly that includes a shield or visor; and (iii) a protective headgear, the protective headgear is worn underneath the protective hood; and wherein the protective face shield assembly comprises:

a. an arcuate frame member that defines an opening, the frame member being formed from inner and outer arcuate frame members;

b. the shield or visor positioned within the opening defined by the arcuate frame member and between the inner and outer arcuate frame members; and c. means for holding the inner arcuate frame member, the outer arcuate frame member and the visor in gas-restrictive, detachable engagement; and wherein the inner arcuate frame member includes a post extending downward from the outer surface of the inner arcuate frame member, the post comprising an inner surface that tapers towards a bottom end of the post, the inner surface of the post faces the opening defined by the arcuate frame member and the inner surface of the post faces the shield or visor, the post comprising at least one clip extending away from an outer surface of the post, and the at least one clip is configured to clip onto a bill or a brim of the protective headgear.

* * * * *